(12) United States Patent
Hashimoto

(10) Patent No.: US 7,555,407 B2
(45) Date of Patent: Jun. 30, 2009

(54) ANOMALY MONITORING DEVICE AND METHOD

(75) Inventor: Yoshihito Hashimoto, Amagasaki (JP)

(73) Assignee: Matsushita Electric Works, Ltd. (JP)

( * ) Notice: Subject to any disclaimer, the term of this patent is extended or adjusted under 35 U.S.C. 154(b) by 115 days.

(21) Appl. No.: 11/892,834

(22) Filed: Aug. 28, 2007

(65) Prior Publication Data

US 2008/0059119 A1   Mar. 6, 2008

(30) Foreign Application Priority Data

Aug. 29, 2006   (JP)   ............................. 2006-232576

(51) Int. Cl.
*G06F 15/00*   (2006.01)
(52) U.S. Cl. .......................................... 702/183; 703/1
(58) Field of Classification Search ................. 702/183, 702/182, 184, 185, 188; 703/1
See application file for complete search history.

(56) References Cited

U.S. PATENT DOCUMENTS

2005/0143976 A1* 6/2005 Steniford .................... 704/202

* cited by examiner

*Primary Examiner*—Edward Raymond
(74) *Attorney, Agent, or Firm*—Bacon & Thomas, PLLC

(57) ABSTRACT

An anomaly monitoring device includes: a signal input unit for receiving a periodic target signal generated by an operating apparatus; a storage unit for storing therein segmented target signals provided from the target signal in a form of a queue; a dividing unit for providing comparing portions of each segmented target signal; a power calculating unit for calculating a power of each comparing portion in each segmented target signal. The device further includes an anomalous input detecting unit which judges that a comparing portion of a latest segmented target signal is abnormal if a power of the comparing portion is in a range of abnormal values when compared with a corresponding comparing portion in a previous segmented target signal, and determines that the signal input unit is abnormal if the number of abnormal comparing portions in the latest segmented target signal exceeds a threshold.

4 Claims, 5 Drawing Sheets

ANOMALY MONITORING DEVICE AND METHOD

FIELD OF THE INVENTION

The present invention relates to an anomaly monitoring device and method for judging whether an apparatus is operating properly or not by using an amount of characteristics extracted from a target signal generated by the operation of the apparatus.

BACKGROUND OF THE INVENTION

Conventionally, there has been proposed various devices for judging whether an apparatus is operating normally or not by using sound waves or vibrations generated by the operation of the apparatus. In such devices, in order to detect sound waves or vibrations generated from the apparatus, an signal input unit having a sensor (transducer) such as a sound detector is provided to convert the sounds or the vibrations into electrical signals and the converted signals is used as a target signal to be analyzed (see, e.g., Patent Reference 1).

In pulse sound detecting method of Patent Reference 1, in order to judge the presence of pulse sounds periodically generated by a rotation of the rotating body, waveform data (a set formed of an amplitude elements) obtained by sampling a waveform in a unit time from a target signal is compared with an amplitude threshold. If the number of elements exceeding the amplitude threshold is greater than a threshold value, it is judged that the sound waves generated by the apparatus contain periodic pulse sounds. The amplitude threshold is determined by multiplying the root-mean-square of the elements of the waveform data by a multiplier.

In Patent Reference 1, the apparatus is judged to be abnormal if pulse sounds are contained. However, there are many kinds of anomalies in the apparatus which can not be simply detected by the existence of pulse sounds. Therefore, in order to judging the presence of anomaly in more complex phenomena, an anomaly monitoring device has been proposed, which determines whether an apparatus is operating normally or not by extracting an amount of characteristics formed of a plurality of parameters extracting from a target signal generated by the operation of the apparatus and then classifying a distribution pattern of parameters in the amount of characteristics by a neural network (neuro computer) or fuzzy logic.

As for a neural network for classifying the distribution pattern of parameters in the amount of characteristics, it has been proposed to employ the competitive learning neural network (Self-Organizing Map (SOM)). The competitive learning neural network is a neural network having two layers, i.e., an input layer and an output layer, and having two modes of operation, a training mode and a checking mode.

In the training mode, training samples are given to the network, which is trained using an unsupervised learning scheme. If training samples are assigned with categories, neurons of the output layer can be associated with the categories and clusters each including neurons of a like category can be formed. Therefore, in the training mode, a clustering map representing categories can be matched to clusters of neurons in the output layer.

In the checking mode, an amount of characteristics (input data) to be classified is given to the competitive learning neural network which completed the training process and the category of a cluster to which an excited neuron belong to is mapped with the clustering map so that the category of the input data can be classified (see, e.g., Patent Reference 2).

[Patent Reference 1]
Japanese Patent Laid-open Application No. 2002-71447.

[Patent Reference 2]
Japanese Patent Laid-open Application No. 2004-354111.

As aforementioned, converting sound waves or vibrations generated from an apparatus to an electrical target signal is required to be done in the signal input unit to judge whether the apparatus is operating normally or not. Therefore, if the signal input unit malfunctions, it cannot be determined whether the apparatus is operating normally or not. Especially, if the apparatus is being monitored while the signal input unit malfunctions, occurrence of crucial failure in the apparatus may not be detected.

SUMMARY OF THE INVENTION

Therefore, the present invention provides an anomaly monitoring device and method capable of detecting an anomaly in a signal input unit in order to prevent the occurrence of continuous monitoring of an apparatus while the signal input unit is out of order.

In accordance with a first aspect of the present invention, there is provided an anomaly monitoring device including: a signal input unit for receiving a periodic target signal generated by an operating apparatus; a characteristics extracting unit for extracting amounts of characteristics including a plurality of parameters from the target signal; a judging unit for judging whether the apparatus is operating normally or not by using the amount of characteristics extracted from the characteristics extracting unit; a storage unit for storing therein a plurality of segmented target signals provided from the target signal in a form of a queue; a dividing unit for providing a number of comparing portions in a time-axis of each segmented target signal stored in the storage unit; and a power calculating unit for calculating a power of each of the comparing portions in each segmented target signal. The anomaly monitoring device further includes an anomalous input detecting unit which judges that a comparing portion of a latest segmented target signal is abnormal if a power of the comparing portion is in a range of abnormal values when compared with a corresponding comparing portion in a previous segmented target signal stored in the storage unit, and determines that the signal input unit is abnormal if the number of abnormal comparing portions in the latest segmented target signal exceeds a threshold number.

In this configuration, since whether the signal input unit is normal or not is detected by using a target signal, an apparatus is prevented from being monitored while the signal input unit is abnormal. Further, it is monitored whether or not the signal input unit operates normally while it is checked whether the apparatus operates normally or not. Therefore, providing an additional checking mode for the signal input unit is unnecessary but the signal input unit can be always monitored. Moreover, a plurality of comparing portions are set in a segmented target signal and powers of the segmented target signals at the same comparing portions are compared, and then a possibility of anomaly occurrence in the signal input unit is investigated from the history in the powers of the segmented target signals. Further, it is determined that the signal input unit is abnormal when many portions of the segmented target signal exhibits the possibility of anomaly occurrence. Therefore, the anomaly in the signal input unit can be also detected with high reliability while the anomaly in the apparatus is being monitored.

In accordance with a second aspect of the present invention, there is provided an anomaly monitoring device including: a signal input unit for receiving a periodic target signal generated by an operating apparatus; a characteristics extracting unit for extracting amounts of characteristics including a plurality of parameters from the target signal; a judging unit for judging whether the apparatus is operating normally or not by using the amount of characteristics extracted from the characteristics extracting unit; a storage unit for storing therein a plurality of segmented target signals provided from the target signal in a form of a queue; a dividing unit for providing a number of comparing portions in a time-axis of each segmented target signal stored in the storage unit; a power calculating unit for calculating a power of each of the comparing portions in each segmented target signal; and a threshold setting unit for setting a threshold value for each of the comparing portions by multiplying by a multiplier the difference between a maximum power and a minimum power among powers of corresponding same comparing portions in the segmented target signals. The anomaly monitoring device further includes an anomalous input detecting unit which judges that a comparing portion of a latest segmented target signal is abnormal if a power of the comparing portion is less than a power of the same comparing portion of an immediately previous segmented target signal and if the difference between the powers exceeds the threshold value, and determines that the signal input unit is abnormal if the number of abnormal comparing portions in the latest segmented target signal exceeds a threshold number.

In accordance with this configuration, if a power of a comparing portion in the latest segmented target signal is less than a power of the corresponding comparing portion in the immediately previous segmented target signal and if the difference between the powers exceeds the threshold value, it is judged that there is a possibility of anomaly occurrence in the signal input unit. Therefore, decrease in signal level caused by degradation of the signal input unit can be detected and it is possible to obtain identical effects to those in the first aspect. Further, the threshold setting unit sets the threshold value for every comparing portion based on powers of the corresponding comparing portion. Thus, a proper threshold value can be set for every comparing portion, and the anomaly in the signal input unit can be detected regardless of anomaly occurrence in the apparatus.

In accordance with the a third aspect of the present invention, there is provided an anomaly monitoring method including: receiving a periodic target signal generated by an operating apparatus; extracting amounts of characteristics including a plurality of parameters from the target signal; judging whether the apparatus is operating normally or not by using the amount of characteristics; storing a plurality of segmented target signals provided from the target signal in a form of a queue; and providing a number of comparing portions in a time-axis of each segmented target signal; obtaining a power of each of the comparing portions in each segmented target signal. The anomaly monitoring method also judges that a comparing portion of a latest segmented target signal is abnormal if a power of the comparing portion is in a range of abnormal values when compared with a corresponding comparing portion in a previous segmented target signal stored in the storage unit, and determining that the signal input unit is abnormal if the number of abnormal comparing portions in the latest segmented target signal exceeds a threshold number.

In this the method, identical effects as in the first aspect can be obtained.

In accordance with a fourth aspect of the present invention, there is provided an anomaly monitoring method including: receiving a periodic target signal generated by an operating apparatus; extracting amounts of characteristics including a plurality of parameters from the target signal; judging whether the apparatus is operating normally or not by using the amount of characteristics; storing a plurality of segmented target signals provided from the target signal in a form of a queue; providing a number of comparing portions in a time-axis of each segmented target signal; obtaining a power of each of the comparing portions in each segmented target signal; and setting a threshold value for each of the comparing portions by multiplying by a multiplier the difference between a maximum power and a minimum power among powers of corresponding same comparing portions in the segmented target signals. The anomaly monitoring method also judges that a comparing portion of a latest segmented target signal is abnormal if a power of the comparing portion is less than a power of the same comparing portion of an immediately previous segmented target signal and if the difference between the powers exceeds the threshold value, and determining that the signal input unit is abnormal if the number of abnormal comparing portions in the latest segmented target signal exceeds a threshold number.

In this method, identical effects as in the second aspect can be obtained.

According to the configuration of the present invention, the occurrence of continuous monitoring of an apparatus while the signal input unit is out of order is prevented, so it is prevented in advance to failure to notice occurrence of anomaly in the apparatus, which is caused by the occurrence of anomaly in the signal input unit. Further, providing an additional time for checking the signal input unit is unnecessary but the signal input unit can be always monitored. Moreover, a possibility of anomaly occurrence in the signal input unit is investigated from the history in the powers of the segmented target signals. Further, it is determined that the signal input unit is abnormal when many portions of the segmented target signal exhibits the possibility of anomaly occurrence. Therefore, the anomaly in the signal input unit can be also detected with high reliability while the anomaly in the apparatus is being monitored.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Figure 1:
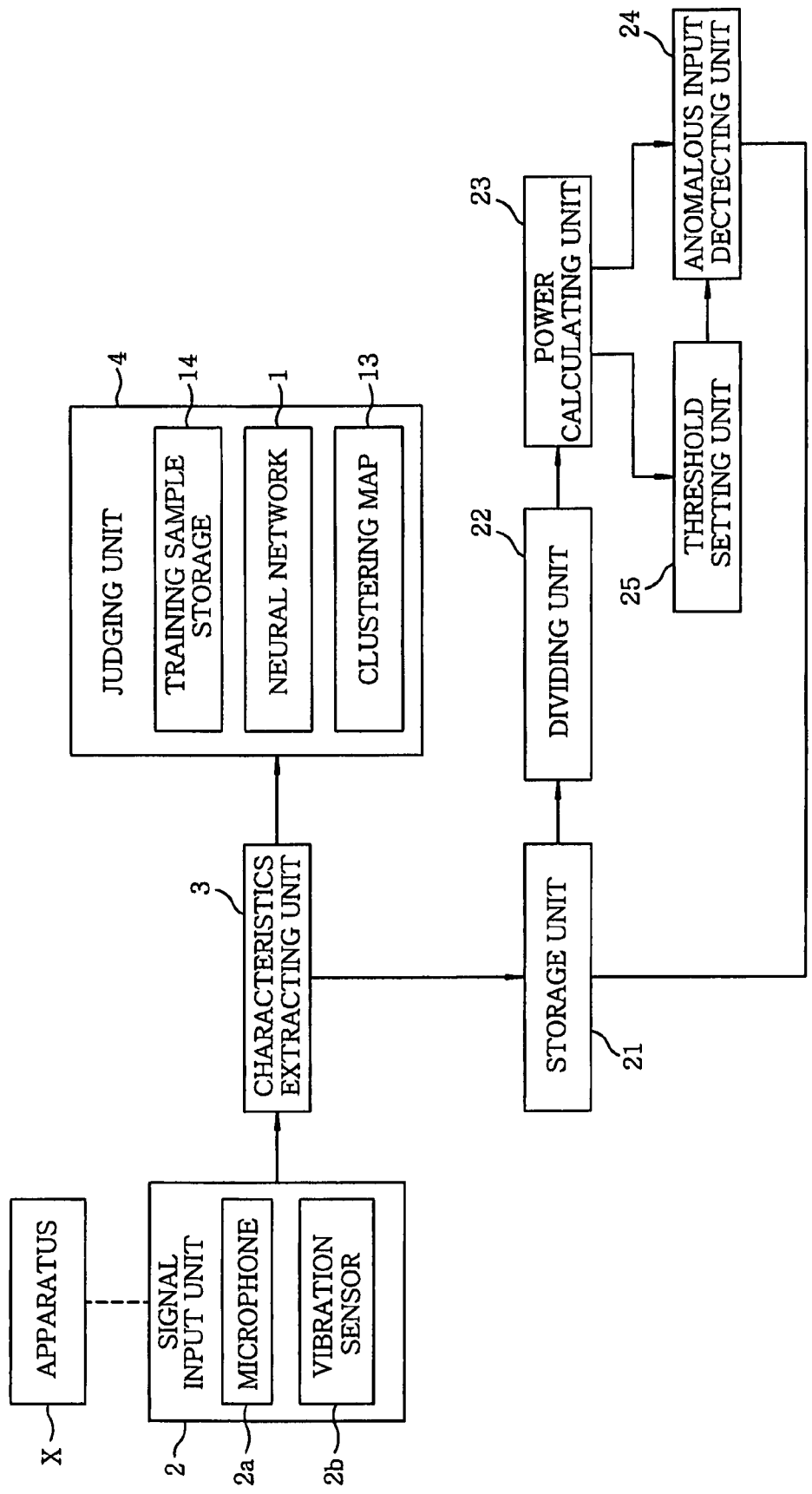
FIG. 1 is a block diagram showing an embodiment in the present invention.
Figure 2:
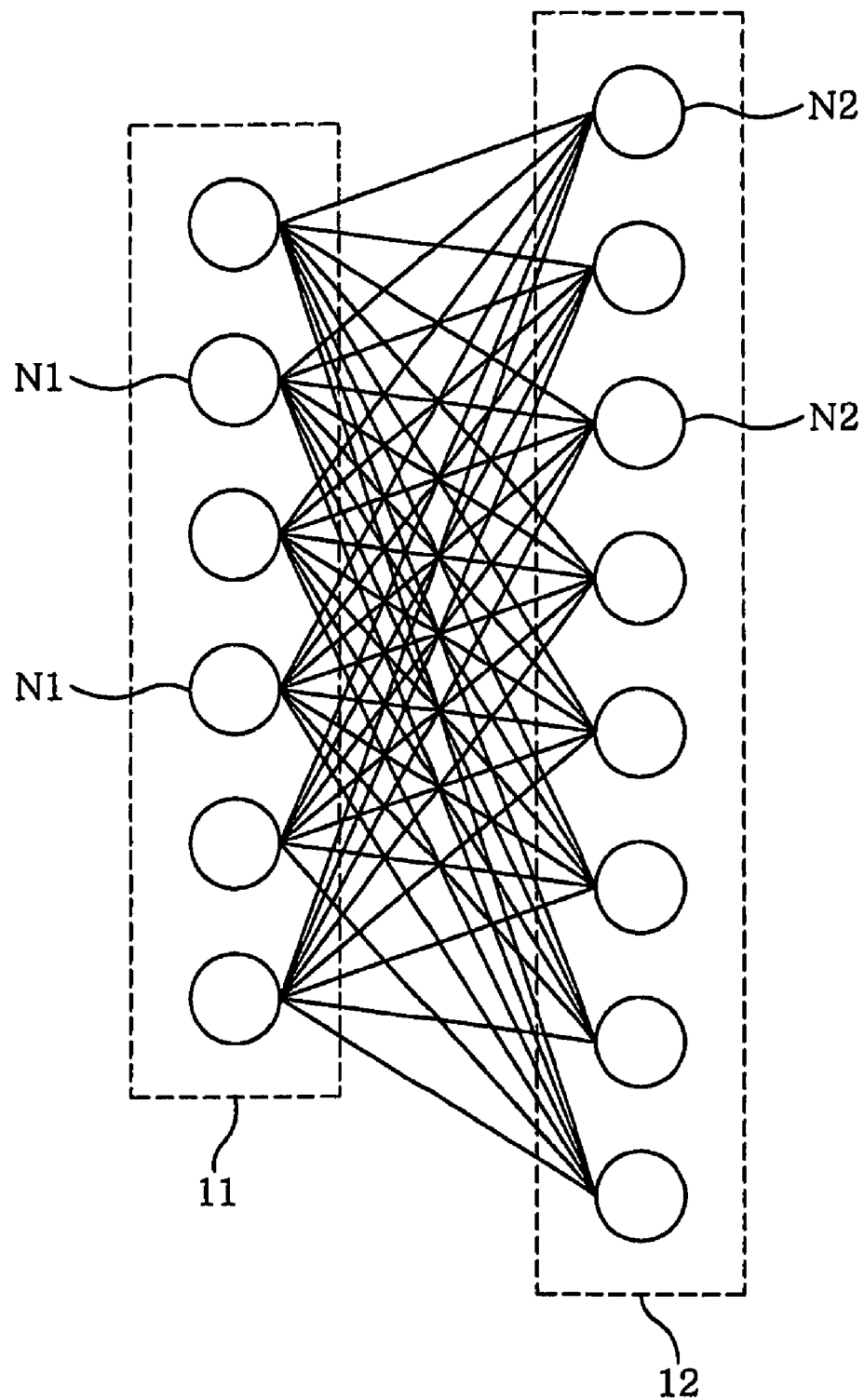
FIG. 2 illustrates a schematic configuration of a neural network used in the embodiment in FIG. 1.

As shown in FIG. 1, an anomaly monitoring device described in the present embodiment uses, e.g., an unsupervised competitive learning neural network (hereinafter, simply referred to as neural networks) 1 in a judging unit 4. As shown in FIG. 2, the neural network 1 has two layers, i.e., an input layer 11 and an output layer 12, and is configured such that every neuron N2 of the output layer 12 is connected to all neurons N1 of the input layer 11. In the embodiment, the neural network 1 may be executed by an application program running at a sequential processing type computer, but a dedicated neuro-computer may be used.

The neural network 1 has two modes of operations, i.e., a training mode and a checking mode. After learning through proper training samples in the training mode, an amount of characteristics (input data) generated from an actual target signal is classified into a category in the checking mode. Here, a target signal treated in the embodiment of the present invention is assumed to be periodic. That is, while the apparatus is normally operating, a target signal of signal waveforms with common characteristics is repeated.

A coupling degree (weight coefficients) of the neurons N1 of the input layer 11 and the neurons N2 of the output layer 12 constituting the neural network 1 is variable. In the training mode, the neural network 1 is trained by inputting training samples to the neural network 1 so that respective weight coefficients of the neurons N1 of the input layer 11 and the neurons N2 of the output layer 12 are decided. In other words, every neuron N2 of the output layer 12 is assigned with a weight vector having the weight coefficients associated with all the neurons N1 of the input layer 11 as elements of the weight vector. Therefore, the weight vector has same number of elements as the number of neurons N1 in the input layer 11, and the number of parameters of the amount of characteristics inputted to the input layer 11 is equal to the number of the elements of the weight vector.

In the checking mode, when input data whose category is to be decided is given to the input layer 11 of the neural network 1, a neuron lying closest to the input data, i.e., a neuron having the shortest Euclidean distance between the its weight vector and the input data, is excited among the neurons N2 of the output layer 12. If categories are assigned to the neurons N2 of the output layer 12 in the training mode, a category of the input data can be recognized through a category of a location of the excited neuron N2.

The neurons N2 of the output layer 12 are associated with zones of a two-dimensional clustering map 13 having 6*6 zones for example in one-to-one correspondence. Therefore, if categories of the training samples are associated with the zones of the clustering map 13, a category corresponding to a neuron N2 excited by input data can be recognized through the clustering map 13. Thus, the clustering map 13 can function as an output unit for outputting a classified result.

When associating categories with the zones of the clustering map 13 (actually the neurons N2 of the output layer 12), a trained neural network 1 is operated in the reverse direction from the output layer 12 to the input layer 11 to estimate data assigned to the input layer 11 for every neuron N2 of the output layer 12. A category of a training sample having the shortest Euclidean distance with respect to the estimated data is used as a category of a corresponding neuron N2 in the output layer 12.

In other word, a category of a training sample having the shortest Euclid distance with respect to a weight vector of a neuron N2 is used for a category of the corresponding neuron N2 of the output layer 12. As a result, the categories of the training samples are reflected to the categories of the neurons N2 of the output layer 12. Further, if a large number of training samples (for example, 150 samples) are employed, categories having similar attributes are arranged close together in the clustering map.

As a result, the neurons N2 excited from the neurons N2 of the output layer 12 in response to training samples belonging to a like category form a cluster formed of a group of neurons N2 residing close together in the clustering map 13. The training samples given to the neural network 1 operating in the training mode are stored in a training sample storage 14 and retrieved therefrom to be used in the neural network 1 when necessary.

A target signal to be classified by the neural network 1 is an electric signal obtained from an apparatus X; and an output of a signal input unit 2 including at least one of a microphone 2a for detecting operation sound of the apparatus X and a vibration sensor 2b for detecting vibration generated by the operation of the apparatus X is used therefor. A configuration of the signal input unit 2 is properly selected according to an apparatus X such that in addition to the microphone 2a and the vibration sensor 2b, various sensors such as a TV camera and an olfactory sensor can be used individually or in combination. Further, output signal generated from the apparatus X can be used as the target signal.

The electrical target signal obtained from the signal input unit 2 is transmitted to the characteristics extracting unit 3 which extracts an amount of characteristics therefrom. In the present embodiment, the target signal given to the characteristics extracting unit 3 by the signal input unit 2 contains vibration components, so that when the characteristics extracting unit 3 receives them, an amount of characteristics of various kinds is representing the vibration components of the target signal is extracted therefrom.

In order to extract an amount of characteristics from a target signal generated from an apparatus X in a same condition, the characteristics extracting unit 3 performs dividing the target signal (segmentation) by using timing signal (trigger signal) synchronous with the operation of the apparatus X or by using wave characteristics of the target signal (for example, a start point and an end point of one bundle of the target signal), thereby generating signals sampled every proper unit time and extracting an amount of characteristics for every unit time. Therefore, the characteristics extracting unit 3 requires a buffer for temporary storing target signals outputted from the signal input unit 2. The buffer may be provided in the characteristics extracting unit 3 or a storage unit 21 which will be described later. Further, the characteristics extracting unit 3 performs for example a pre-processing to reduce noises by restricting frequency band, if necessary. Further, the characteristics extracting unit 3 has a function for converting the target signal to a digital signal.

For the sake of simple description, it is assumed that a plurality of frequency components (power of every frequency band) are extracted from vibration components of the segmented target signal and each frequency component is used as the amount of characteristics. FFT (Fast Fourier Transform) or a filter bank having a plurality of bandpass filters may be used in extracting the frequency components. Which frequency component is used as the amount of characteristics is decided depending on the type of the target apparatus X or anomalies to be detected. Amounts of characteristics gained from the characteristics extracting unit 3 at every unit time are provided to the neural network 1 whenever amounts of characteristics are extracted.

In the neural network 1 in accordance with the present embodiment, only normal categories are established in the training mode. Therefore, the above-described operation of the trained neural network 1 in the reverse direction from the output layer 12 to the input layer 11 to create a clustering map need not be necessarily carried out.

Declared by the neural network 1 is "abnormal" when a neuron N2 of the output layer 12 excited by the input data in the checking mode does not belong to normal categories and a specific condition (for example, a condition that Euclidean distances with respect to the neurons N2 belonging to the normal categories exceed a threshold value) is satisfied. Further, in the checking mode, when a neuron N2 of the output layer 12 excited by the input data does not belong to the normal categories and the specific condition is not satisfied, "grey (or uncertain)" which cannot be determined as being "normal" or "abnormal" is judged.

Hereinafter, features of the configuration for monitoring the anomaly of the signal input unit 2 in accordance with the embodiment of the invention will be described. In order to detect the anomaly in the signal input unit 2, a target signal of a predetermined number of periods is used in the present embodiment. As aforementioned, the target signal is then segmented by the characteristics extracting unit 3 and converted into digital signals to generate digitized segmented target signals (referred to as segmented target signals hereinafter). Therefore, a storage unit 21 is provided for storing therein the segmented target signals received from the characteristics extracting unit 3. In other words, the characteristics extracting unit 3 converts the target signal into the amounts of characteristics, which are provided to the neural network 1, and the segmented target signals to be provided to the storage unit 21. The storage unit 21 is a waiting sequence (queue) having a capacity storing a specific number of (a plurality of) segmented target signals. In other words, the storage unit 21 is a FIFO (first in first out), and the specific number of segmented target signals are stored in the storage unit 21 in the order in time series.

Figure 3:
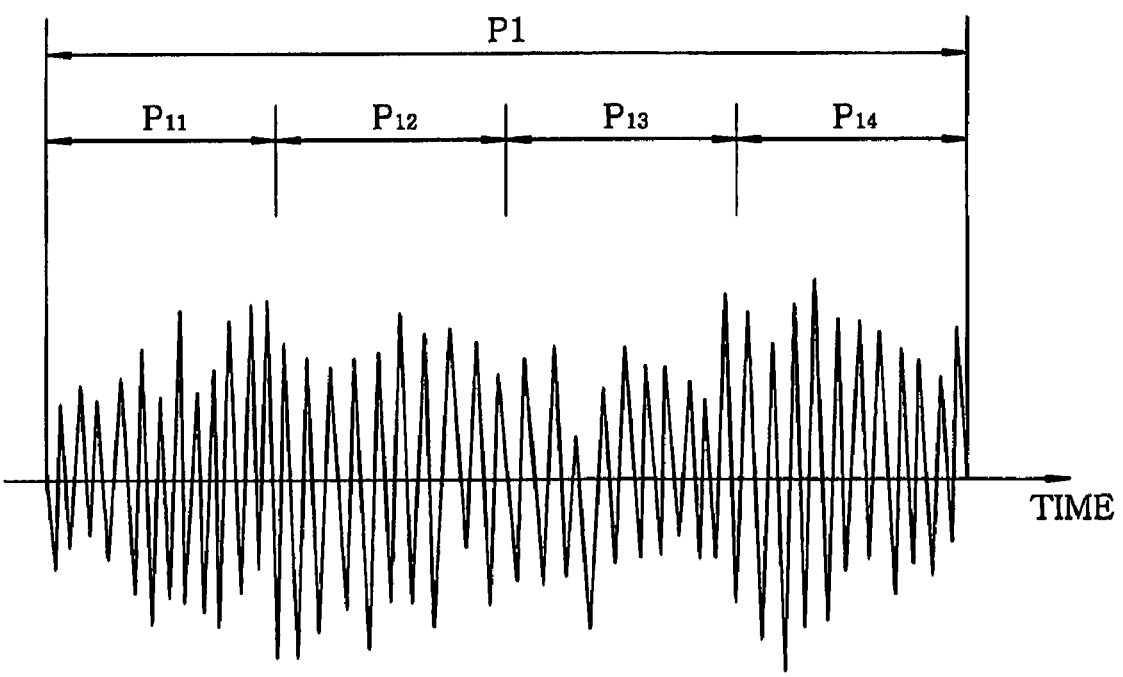
FIG. 3 describes an operation of the embodiment.

A dividing unit 22 receives each segmented target signal stored in the storage unit 21 and establishes a plurality of comparing portions in a time-axis of each segmented target signal. For example, as shown in FIG. 3, one segmented target signal P1 is divided into a plurality of, e.g., N, portions and the divided portions serve as comparing portions $P_{11}$ to $P_{1N}$. However, it would be appropriate as long as the comparing portions $P_{11}$ to $P_{1N}$ are established within a range of the segmented target signal P1, and all of the divided portions of the segmented target signal P1 need not be employed as the comparing portions. In other words, it is possible that there may exist, between neighboring comparing portions, a divided portion not serving as a comparing portion and further, the comparing portions $P_{11}$ to $P_{1N}$ may be different from each other in length. That is, it would be appropriate if there is a rule for determining a location and a length for each of the comparing portions $P_{11}$ to $P_{1N}$ in the time axis of the segmented target signal.

After the comparing portions $P_{11}$ to $P_{1N}$ are established by the dividing unit 22, a power calculating unit 23 computes effective values for each of the comparing portions $P_{11}$ to $P_{1N}$, and stores them, e.g., in a storage provided therein. The power calculating unit 23 serves to obtain a power of each of the comparing portions $P_{11}$ to $P_{1N}$, but a integration value or a mean of absolute values may be used instead of the effective value. In other word, any value can be obtained by the power calculating unit 23 as long as the obtained value is a measure of the power of each of the comparing portions $P_{11}$ to $P_{1N}$ of the segmented target signal P1.

Figure 4A:
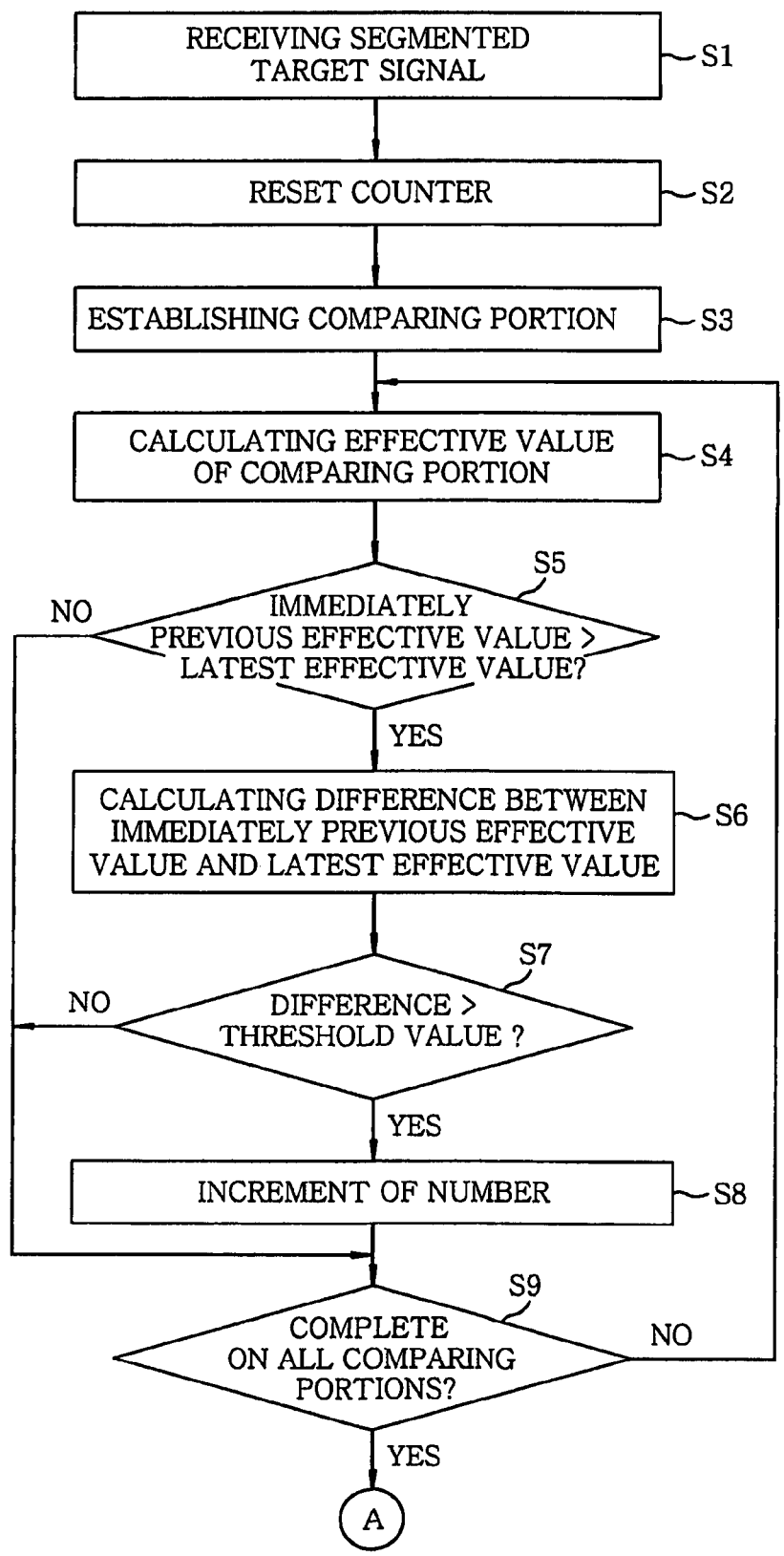
FIGS. 4A and 4B describe a flow chart describing an operation of the embodiment.
Figure 4B:
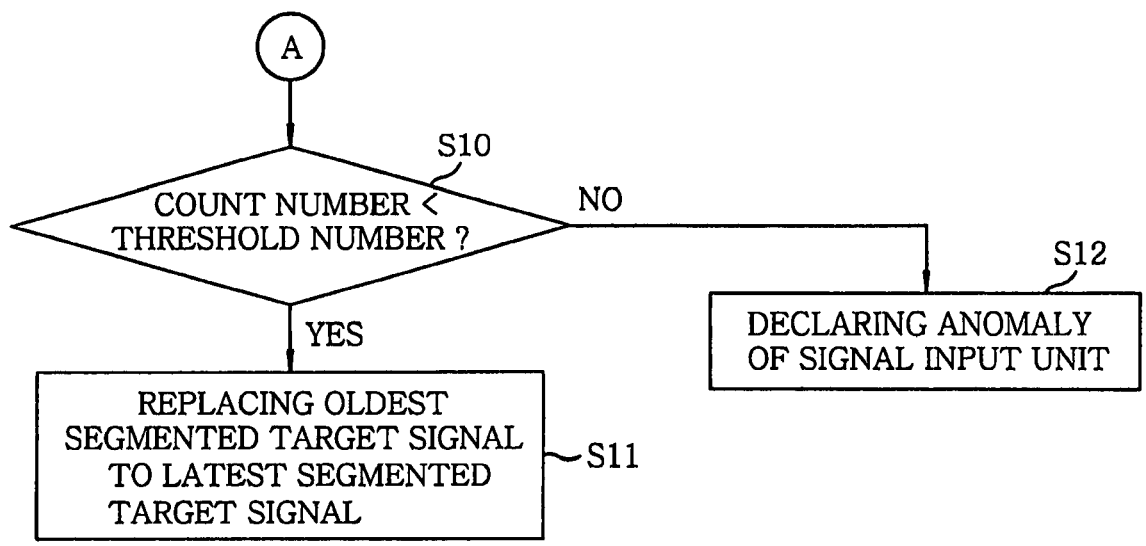

The effective values computed by the power calculating unit 23 are provided to an anomalous input detecting unit 24, which judges whether the signal input unit 2 is operating normally or not as follows. That is, as shown in FIGS. 4A to 4B, the magnitude of an effective value of each of the comparing portions $P_{11}$ to $P_{1N}$ in a latest segmented target signal P1 received from the characteristics extracting unit 3 is compared with the magnitude of an effective value of a same comparing portion in an immediately previous segmented target signal P1 stored in the storage unit 21 (Step 5). If the effective value of a comparing portion in the latest segmented target signal. P1 is less than the effective value of the same comparing portion in the immediately previous segmented target signal P1, the difference between the effective values is calculated (Step 6). If the difference is greater than a specific threshold value (Step 7), the corresponding comparing portion is declared as an abnormal portion and the number of abnormal portions is increased (Step 8).

The number of abnormal portions out of all the comparing portions $P_{11}$ to $P_{1N}$ included in the target signal P1 is counted (Step 9), and then the number of abnormal portions is compared with a specified threshold number (Step 10). If the number of abnormal portions is less than the threshold number, an oldest segmented target signal P1 is replaced with the latest segmented target signal P1 in the storage unit 21 (Step 11). If the number of abnormal portions is greater than or equal to the specified threshold number, the signal input unit 2 is judged and declared to be abnormal (Step 12). In other words, the anomalous input detecting unit 24 detects an abnormal portion by comparing the effective values of the latest segmented target signal P1 and of the immediately previous segmented target signal P1 stored in the storage unit 21. Thereafter, if the number of abnormal portions included in the latest segmented target signal P1 exceeds the specified threshold number (for example, 80% of the number of comparing portions $P_{11}$ to $P_{1N}$ established in the segmented target signal P1) the anomalous input detecting unit 24 judges and declares that the signal input unit 2 is out of order.

Steps S1 to S4 in FIG. 4A will now be described. After a new segmented target signal is received from the characteristics extracting unit 3 (Step 1), the dividing unit 22 establishes the comparing portions $P_{11}$ to $P_{1N}$ therein (Step 3), and then, the power calculating unit 23 calculates the effective values of the respective comparing portions $P_{11}$ to $P_{1N}$ (Step 4). Step 2 is a process of resetting a counter for counting the number of abnormal portions (S2).

The threshold value used in determining an abnormal portion is set by the threshold setting unit 25. In other words, the threshold setting unit 25 calculates the difference between a maximum and a minimum effective value from a set of effective values of every identical comparing portion $P_{11}, \ldots$, or $P_{1N}$ of segmented target signals P1 stored in the storage unit 21. After then, the threshold value for each of the comparing portions $P_{11}$ to $P_{1N}$ is decided by multiplying the difference with a specific value which is not less than 1. For example, the difference between a minimum and a maximum effective value among the effective values of the comparing portions $P_{11}$ in all the segmented target signals P1 stored in the storage unit 21 is computed and the difference is multiplied by the specific value to obtain a threshold value for the comparing portion $P_{11}$.

Further, judging whether or not a comparing portion $P_{11}, \ldots$, or $P_{1N}$ is abnormal can be carried out by a method other than the above described one, which uses a difference in magnitudes between the latest segmented target signal P1 and the immediately previous segmented target signal P1. For instance, variation tendency of effective values for each of the comparing portions $P_{11}$ to $P_{1N}$ can be obtained based on past segmented target signals P1 stored in the storage unit 2. Then, a range of effective values for each comparing portion can be estimated based on the variation tendency by linear prediction. If the effective value of a comparing portion in the latest segmented target signal P1 does not fall within the estimated range of the corresponding comparing portion, the effective value is regarded to be abnormal and the comparing portion having generated the abnormal effective value is judged as an abnormal portion. In this case, the abnormal effective value is detected by using the history of past segmented target signals P1, so that whether or not the signal input unit 2 is normally operating can be judged with high reliability while considering variation tendency in the performance of the signal input unit 2.

While the invention has been shown and described with respect to the embodiments, it will be understood by those skilled in the art that various changes and modifications may be made without departing from the scope of the invention as defined in the following claims.

What is claimed is:

1. An anomaly monitoring device comprising:
a signal input unit for receiving a periodic target signal generated by an operating apparatus;
a characteristics extracting unit for extracting amounts of characteristics including a plurality of parameters from the target signal;
a judging unit for judging whether the apparatus is operating normally or not by using the amount of characteristics extracted from the characteristics extracting unit;
a storage unit for storing therein a plurality of segmented target signals provided from the target signal in a form of a queue;
a dividing unit for providing a number of comparing portions in a time-axis of each segmented target signal stored in the storage unit;
a power calculating unit for calculating a power of each of the comparing portions in each segmented target signal; and
an anomalous input detecting unit which judges that a comparing portion of a latest segmented target signal is abnormal if a power of the comparing portion is in a range of abnormal values when compared with a corresponding comparing portion in a previous segmented target signal stored in the storage unit, and determines that the signal input unit is abnormal if the number of abnormal comparing portions in the latest segmented target signal exceeds a threshold number.

2. An anomaly monitoring device comprising:
a signal input unit for receiving a periodic target signal generated by an operating apparatus;
a characteristics extracting unit for extracting amounts of characteristics including a plurality of parameters from the target signal;
a judging unit for judging whether the apparatus is operating normally or not by using the amount of characteristics extracted from the characteristics extracting unit;
a storage unit for storing therein a plurality of segmented target signals provided from the target signal in a form of a queue;
a dividing unit for providing a number of comparing portions in a time-axis of each segmented target signal stored in the storage unit;
a power calculating unit for calculating a power of each of the comparing portions in each segmented target signal;
a threshold setting unit for setting a threshold value for each of the comparing portions by multiplying by a multiplier the difference between a maximum power and a minimum power among powers of corresponding same comparing portions in the segmented target signals; and
an anomalous input detecting unit which judges that a comparing portion of a latest segmented target signal is abnormal if a power of the comparing portion is less than a power of the same comparing portion of an immediately previous segmented target signal and if the difference between the powers exceeds the threshold value, and determines that the signal input unit is abnormal if the number of abnormal comparing portions in the latest segmented target signal exceeds a threshold number.

3. An anomaly monitoring method comprising:
receiving a periodic target signal generated by an operating apparatus;
extracting amounts of characteristics including a plurality of parameters from the target signal;
judging whether the apparatus is operating normally or not by using the amount of characteristics;
storing a plurality of segmented target signals provided from the target signal in a form of a queue;
providing a number of comparing portions in a time-axis of each segmented target signal;
obtaining a power of each of the comparing portions in each segmented target signal;
judging that a comparing portion of a latest segmented target signal is abnormal if a power of the comparing portion is in a range of abnormal values when compared with a corresponding comparing portion in a previous segmented target signal stored in the storage unit; and
determining that the signal input unit is abnormal if the number of abnormal comparing portions in the latest segmented target signal exceeds a threshold number.

4. An anomaly monitoring method comprising:
receiving a periodic target signal generated by an operating apparatus;
extracting amounts of characteristics including a plurality of parameters from the target signal;
judging whether the apparatus is operating normally or not by using the amount of characteristics;
storing a plurality of segmented target signals provided from the target signal in a form of a queue;
providing a number of comparing portions in a time-axis of each segmented target signal;
obtaining a power of each of the comparing portions in each segmented target signal;
setting a threshold value for each of the comparing portions by multiplying by a multiplier the difference between a maximum power and a minimum power among powers of corresponding same comparing portions in the segmented target signals;
judging that a comparing portion of a latest segmented target signal is abnormal if a power of the comparing portion is less than a power of the same comparing portion of an immediately previous segmented target signal and if the difference between the powers exceeds the threshold value; and
determining that the signal input unit is abnormal if the number of abnormal comparing portions in the latest segmented target signal exceeds a threshold number.

* * * * *